United States Patent
Ilias et al.

(10) Patent No.: US 8,761,999 B2
(45) Date of Patent: Jun. 24, 2014

(54) LEVEL CONTROL SYSTEM FOR A VEHICLE, AND METHOD FOR OPERATING A LEVEL CONTROL SYSTEM FOR A VEHICLE

(75) Inventors: Heike Ilias, Wedemark (DE); Marc Nettelmann, Garbsen (DE); Thomas Sprengel, Stuttgart (DE)

(73) Assignee: Continental Aktienesellschaft, Hannover (DE)

( * ) Notice: Subject to any disclaimer, the term of this patent is extended or adjusted under 35 U.S.C. 154(b) by 1131 days.

(21) Appl. No.: 12/067,307

(22) PCT Filed: Sep. 1, 2006

(86) PCT No.: PCT/EP2006/008556
§ 371 (c)(1),
(2), (4) Date: Mar. 19, 2008

(87) PCT Pub. No.: WO2007/033754
PCT Pub. Date: Mar. 29, 2007

(65) Prior Publication Data
US 2008/0258413 A1 Oct. 23, 2008

(30) Foreign Application Priority Data
Sep. 20, 2005 (DE) .................. 10 2005 044 806

(51) Int. Cl.
| | | |
|---|---|---|
| *G06F 17/00* | (2006.01) | |
| *B60B 21/00* | (2006.01) | |
| *B60G 17/015* | (2006.01) | |
| *B60G 17/052* | (2006.01) | |
| *B60G 17/0195* | (2006.01) | |

(52) U.S. Cl.
USPC ............ 701/37; 701/38; 340/440; 280/5.507; 280/5.514; 180/41

(58) Field of Classification Search
USPC ................ 701/36, 37, 38, 39, 40, 48, 1, 29.1, 701/29.2; 180/41; 280/5.5, 5.507, 5.512, 280/5.514, 6.15, 5.504; 340/425.5, 438, 340/439, 440
See application file for complete search history.

(56) References Cited

U.S. PATENT DOCUMENTS

| | | |
|---|---|---|
| 1,004,443 A1 | 6/2001 | Behmenbrug et al. |
| 6,266,590 B1 | 7/2001 | Kutscher et al. |
| 1,017,449 A1 | 8/2001 | Stiller |
| 6,698,778 B2 | 3/2004 | Roemer et al. |

FOREIGN PATENT DOCUMENTS

| | | |
|---|---|---|
| DE | 10055108 A1 | 5/2002 |
| GB | 2344323 | 6/2000 |

*Primary Examiner* — Thomas Tarcza
*Assistant Examiner* — Edward Pipala

(57) ABSTRACT

A level control system for a vehicle includes a pressure generator (10) for generating a pressure difference between a reservoir (11) containing a pressurized medium and at least one pressure-controlled actuating mechanism (12i) in order to adjust a predefined vehicle chassis level ($d_{i,soll}$), and a valve unit (13) for performing an overflow process between the reservoir (11) containing the pressurized medium and the at least one pressure-controlled actuating mechanism (12i). An evaluation unit (24) decides whether and to what extent the predefined vehicle chassis level ($d_{i,\,soll}$) can be adjusted by exclusively actuating the valve unit (13) based on a vehicle chassis level ($d_{i,erw}$) that is to be expected in case the overflow process is performed.

16 Claims, 1 Drawing Sheet

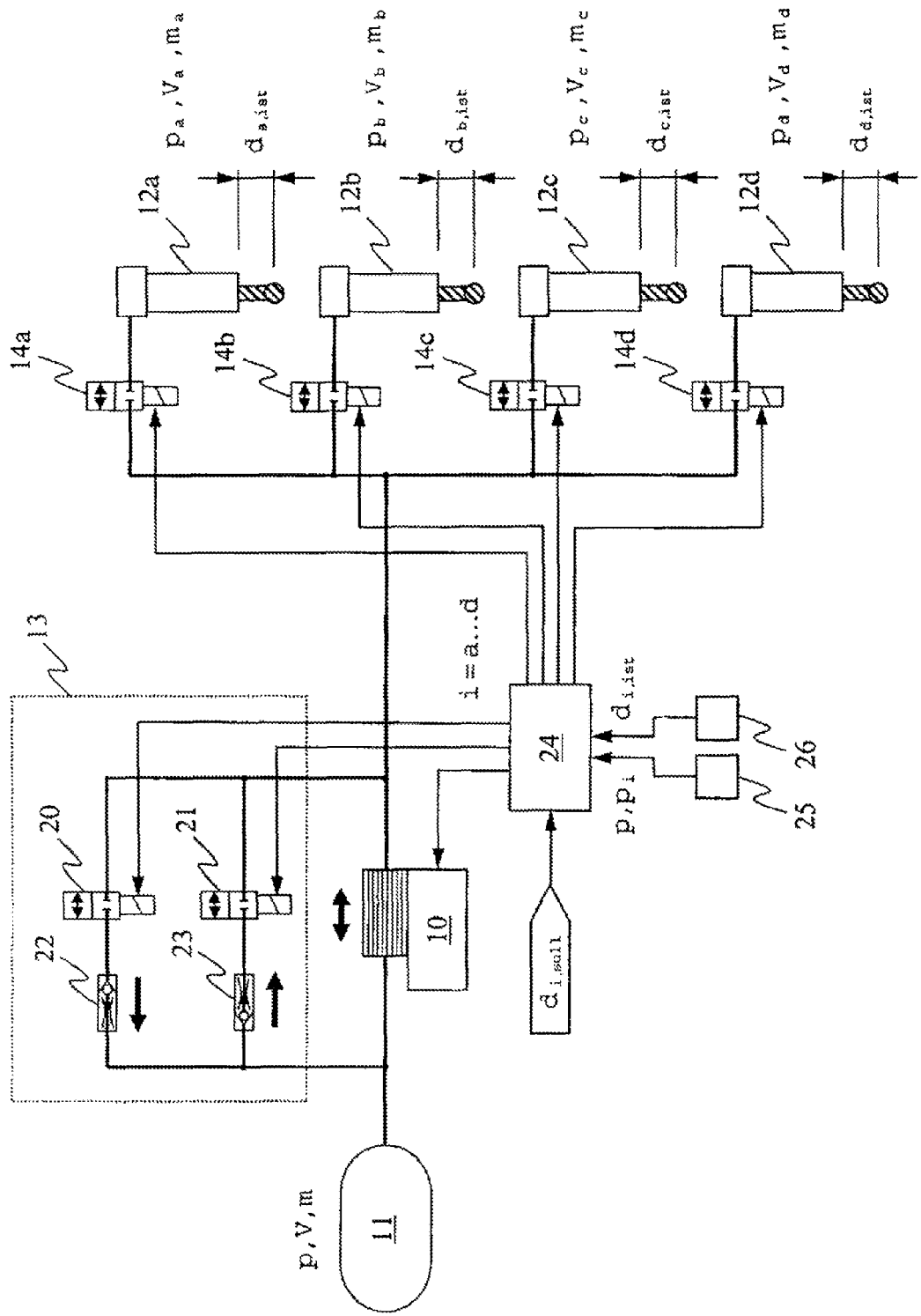

LEVEL CONTROL SYSTEM FOR A VEHICLE, AND METHOD FOR OPERATING A LEVEL CONTROL SYSTEM FOR A VEHICLE

This application is the U.S. national phase of international application PCT/EP2006/008556 filed Sep. 1, 2006, which designated the U.S. and which claims the benefit of priority of German Patent Application Number 10 2005 0444 806.2 filed Sep. 20, 2005. The contents of each of the aforementioned documents are incorporated herein in their entirety.

BACKGROUND OF THE INVENTION

The invention relates to a level control system for a vehicle and to a method for operating a level control system for a vehicle, having a pressure generator for generating a pressure difference between a pressure medium reservoir and at least one pressure-controlled actuating device by means of which it is possible to set a prescribed vehicle body level, and having a valve device for carrying out an overflow process between the pressure medium reservoir and the at least one pressure-controlled actuating device.

Such a level control system for a vehicle emerges from application DE 100 06 024 C1. The level control system has at least one air spring that can be filled with compressed air in order to raise the vehicle body. If it is established on the basis of a pressure difference generated by using a compressor between a compressed air reservoir and the at least one air spring that the air pressure in the compressed air reservoir is greater than that in the at least one air spring, then in order to raise the vehicle body the at least one air spring is firstly connected to the compressed air reservoir by actuating a valve device in such a way that compressed air overflows from the compressed air reservoir into the at least one air spring. In this case, the air pressure in the air spring increasingly approximates to that in the compressed air reservoir.

If the pressure difference present between the compressed air reservoir and the at least one air spring reaches a prescribed threshold value that corresponds substantially to the production of a pressure equilibrium between the compressed air reservoir and the at least one air spring, and if it is established that there is a further need to fill the at least one air spring in order to raise the vehicle body to the desired level, this is performed by additional actuation of the compressor.

It is disadvantageous that the compressor is actuated only once a pressure equilibrium has substantially been set between the compressed air reservoir and the at least one air spring. Time delays in carrying out the raising operation are then unavoidable.

It is therefore an object of the present invention to develop a device and/or a method of the type mentioned at the beginning in such a way that a prescribed vehicle body level can be set largely without delay on the basis of carrying out an overflow process between the pressure medium reservoir and the at least one pressure-controlled actuating device.

SUMMARY OF THE INVENTION

This object is achieved in the following way:
Apart from a pressure generator for generating a pressure difference between a pressure medium reservoir and at least one pressure-controlled actuating device by means of which it is possible to set a prescribed vehicle body level, the level control system for a vehicle further comprises a valve device for carrying out an overflow process between the pressure medium reservoir and the at least one pressure-controlled actuating device.

According to the invention, an evaluation unit decides on the basis of a vehicle body level to be expected for the case of carrying out the overflow process whether and to what extent it is possible to set the prescribed vehicle body level solely by actuating the valve device.

It is possible in this way to establish even before beginning the setting operation whether the prescribed vehicle body level can probably be set on the basis of carrying out an overflow process and whether, if appropriate, there is an additional or alternative need for a corresponding actuation of the pressure generator. Unnecessary delays on the basis of a late actuation of the pressure generator can largely be avoided thereby.

The pressure generator is typically an electrically driven compressor of current design. Since the compressor is actuated only when it is not possible, or only conditionally possible, to set the prescribed vehicle body level solely by actuating the valve device, the compressor run time as seen overall is reduced such that it is possible not only to prevent premature wear of the compressor, but also to substantially reduce the noise level in the region of the vehicle. The latter is of particular importance especially when the vehicle is stationary.

The level control system serves, for example, for temporarily lowering the vehicle body in the case of higher driving speeds, in order to reduce the air resistance and thus the fuel consumption of the vehicle.

The decision as to whether and to what extent it is possible to set the prescribed vehicle body level solely by actuating the valve device can be decided as a function of a comparison, which can be easily made by computer, between the prescribed vehicle body level and the vehicle body level to be expected for carrying out the overflow process.

If, for example, it is intended to raise the vehicle body to a prescribed vehicle body level, this is probably possible solely by actuating the valve device when it emerges on the basis of the comparison that the vehicle body level to be expected (minus a prescribed safety reserve) is greater than or equal to the prescribed vehicle body level. Similar considerations apply to the case of lowering the vehicle body to a prescribed vehicle body level.

By suitably prescribing the safety reserve, it is possible to achieve indirectly that the vehicle body is raised or lowered, respectively, solely by actuating the valve device only when, as seen over the entire setting operation, there is an adequate pressure gradient between the pressure medium reservoir and the at least one pressure-controlled actuating device in order to ensure that the prescribed vehicle body level is rapidly achieved on the basis of carrying out the overflow process.

If it is established that it is not possible to set the prescribed vehicle body level solely by actuating the valve device within a prescribed time period, which can easily be detected by evaluating the pressure conditions present at the beginning of the setting operation between the pressure medium reservoir and the at least one pressure-controlled actuating device, the pressure generator is actuated in a supporting fashion—in order to speed up the setting operation.

The pressure generator can be actuated here in a supporting fashion, in particular, with the expiry of the prescribed time period when, for example, it is established that, contrary to the original prediction or the original expectations, it has not yet been possible to achieve the prescribed vehicle body level solely by actuating the valve device.

The vehicle body level to be expected can be calculated, in particular, on the basis of a pressure difference determined between the pressure medium reservoir and the at least one pressure-controlled actuating device. To this end, it is firstly estimated which pressure medium quantity may overflow between the pressure medium reservoir and the at least one pressure-controlled actuating device until a pressure equalization is produced. Finally, the vehicle body level to be expected at the at least one pressure-controlled actuating device is calculated from the pressure medium quantity thus estimated. The determination of the pressure difference can be performed here by using conventional pressure sensors.

The at least one pressure-controlled actuating device is preferably a pneumatic or hydraulic spring leg of conventional design that is, in particular, a component of an active running gear of the vehicle. Such active running gears are present in any case with many vehicles, and so they are available for cost-efficient co-use.

The device is advantageously a level control system having a closed pressure medium circuit, and so it is possible from the very start to exclude an escape into the surroundings of, in particular, compressed air loaded with contaminants (such as, for example, lubricant residues, wear-induced abrasion material and the like).

The inventive level control system for a vehicle and the inventive method for operating a level control system for a vehicle are explained in more detail below with the aid of the attached drawing. Here, the sole FIGURE shows a schematically illustrated exemplary embodiment of the inventive level control system.

BRIEF DESCRIPTION OF THE DRAWINGS

In the drawing, the FIGURE shows a level control system according to the invention.

DETAILED DESCRIPTION OF THE DRAWINGS

Electrical control lines are illustrated in the FIGURE by thin continuous lines, and pressure lines by thick ones.

The level control system comprises a pressure generator 10 for generating a pressure difference between a pressure medium reservoir 11 and at least one pressure-controlled actuating device 12$i$ (i=a . . . d) by means of which it is possible to set a prescribed vehicle body level $d_{i,soll}$. Moreover, a valve device 13 is present for carrying out an overflow process between the pressure medium reservoir 11 and the at least one pressure-controlled actuating device 12$i$.

The pressure generator 10, which is designed in the present case as an electrically actuatable compressor, permits pressure medium to be pumped to and fro in the closed pressure medium circuit of the level control system between the pressure medium reservoir 11 and the at least one pressure-controlled actuating device 12$i$.

The at least one pressure-controlled actuating device 12$i$ is, for example, a pneumatic or hydraulic spring leg that is arranged between a vehicle wheel and a support point assigned to the vehicle body in order to suppress undesired movements of the vehicle body caused by driving. The spring leg comprises, in essence, a pressure cylinder and a piston arranged therein in a fashion capable of displacement by pressure.

A four-wheel vehicle is intended to be understood in this case, and so a total of four of the abovementioned actuating devices 12*a* to 12*d* are present, the actuating devices 12*a* to 12*d* being components of an active running gear of the vehicle. In each case, there is a shutoff valve 14*a* to 14*d* connected upstream of each of the actuating devices 12*a* to 12*d*, and thus a mutually independent control of the actuating devices 12*a* to 12*d* is made possible.

In order to carry out the overflow process for each of the two possible flow directions, the valve device 13 comprises a separate electrically actuatable bypass valve 20 or 21, respectively. A one-way valve 22 or 23, respectively, connected in series in each case, prevents an undesired backflow of pressure medium against the intended flow direction from being able to occur with an open bypass valve 20 or 21.

The valve device 13 illustrated in the FIGURE is intended here merely by way of example. Thus, the valve device 13 can also alternatively have any desired other design that permits an overflow process from the pressure medium reservoir 11 in the direction of the at least one actuating device 12$i$ (and vice versa) to be carried out in a targeted way. In the case of a closed pressure medium circuit, such valve devices are present as required by principle, and so they are available from the very start for cost-efficient co-use in such a case.

There is also an evaluation unit 24 that decides on the basis of a vehicle body level $d_{i,erw}$ to be expected in the case of carrying out the overflow process whether and to what extent it is possible to set the prescribed vehicle body level $d_{i,soll}$ solely by actuating the valve device 13, the latter being performed as a function of a comparison between the prescribed vehicle body level $d_{i,soll}$ and the vehicle body level $d_{i,erw}$ to be expected.

The vehicle body level $d_{i,soll}$ to be set is prescribed, for example, by a control device (not illustrated) that is of a higher level than the level control system and is provided for temporarily lowering the vehicle body in the case of relatively high driving speeds, or in order to correct positional changes of the vehicle body caused by load changes.

The vehicle body level $d_{i,erw}$ to be expected in the case of carrying out the overflow process is calculated by the evaluation unit 24 on the basis of a determined pressure difference $$\Delta p = p - \bar{p}_{i,i=a\ldots d} \quad (1.1),$$

in addition to the current internal pressure p of the pressure medium reservoir 11, there being considered for the purpose of determining the pressure difference $\Delta p$ a mean pressure $\bar{p}_{i,i=a\ldots d}$ that is used as the mean value of the internal pressures of the actuating devices 12$i$ affected by the setting operation, that is to say of those actuating devices 12$i$ at which the setting of a prescribed vehicle body level $d_{i,soll}$ is intended. A general relationship of the form $$\bar{p}_{i,i=a\ldots d} = \frac{\sum_i g_i p_i}{\sum_i g_i} \quad (1.2)$$

holds for this, in addition to the current internal pressure $p_i$ of the actuating device 12$i$, a respectively associated weighting factor gi that assumes the value 1 for the actuating devices 12$i$ affected by the setting operation and the value 0 for the remaining actuating devices 12$i$ further being a feature. If it is intended to carry out a setting operation for only one of the actuating devices 12$i$, it holds correspondingly that $\bar{p}_{i,i=a\ldots d} = p$.

The sensing of the internal pressures p and $p_i$ is performed by means of a pressure sensing device 25 whose signals are fed to the evaluation unit 24 for determining the pressure difference $\Delta p$. To this end, the pressure sensing device 25 has a number of pressure sensors (not illustrated) that are respectively assigned to the pressure medium reservoir 11 and to the actuating devices 12$i$.

Starting from the determined pressure difference $\Delta p$, the evaluation unit 24 considers the known internal volume V of the pressure medium reservoir 11 and the current internal volume $V_i$, dependent on the respective piston position, of the actuating devices 12$i$ affected by the setting operation in order to estimate which pressure medium quantity $\Delta N_{max}$ may overflow between the pressure medium reservoir 11 and the relevant actuating devices 12$i$ until a pressure equalization is produced. The current internal volume $V_i$ is derived in this case from the vehicle body level $d_{i,ist}$ instantaneously present at the actuating device 12$i$; the latter level permits a direct conclusion to be drawn in relation to the respective piston position of the actuating device 12$i$.

In order to determine the instantaneously present vehicle body level $d_{i,ist}$, a level sensing device 26 is present whose signals are fed to the evaluation unit 24. To this end, the level sensing device 26 has a number of actuator travel sensors (not illustrated) that are respectively assigned to the actuating devices 12$i$.

For each of the actuating devices 12$i$ affected by the setting operation, the evaluation unit 24 calculates a vehicle body level $d_{i,soll}$ to be expected for carrying out the overflow process, doing so from the pressure medium quantity $\Delta N_{max}$ thus estimated, the current internal volume $V_i$ of the actuating device 12$i$ and its characteristic actuator response—in particular the change in the pressure-effective piston area of the actuating device 12$i$ as a function of the instantaneously present vehicle body level $d_{i,ist}$.

If, for example, it is intended to raise the vehicle body to a prescribed vehicle body level $d_{i,soll}$, this is probably possible solely by actuating the valve device 13 when it emerges on the basis of the comparison between the prescribed vehicle body level $d_{i,soll}$ and the vehicle body level $d_{i,erw}$ to be expected that the vehicle body level $d_{i,erw}$ to be expected minus a prescribed safety reserve $\Delta d_{safe}$ ($\approx 1 \ldots 3$ cm) is greater than or equal to the prescribed vehicle body level $d_{i,soll}$, $$d_{i,erw} - \Delta d_{safe} \geq d_{i,soll}. \quad (2.1)$$

If this applies, the evaluation unit 24 produces a pressure connection between the pressure medium reservoir 11 and the actuating devices 12$i$ affected by the setting operation, and this is performed by opening the bypass valve 21 and the shutoff valves 14$i$ of the relevant actuating devices 12$i$. In this case, pressure medium flows from the pressure medium reservoir 11 into the respective actuating devices 12$i$, the vehicle body thereby being raised in the region thereof.

If it is established that the setting of the prescribed vehicle body level $d_{i,soll}$ is not possible within a prescribed time period $\Delta t_{max}$ solely by actuating the valve device 13, the pressure generator 10 is actuated in a supporting fashion.

The supporting actuation of the pressure generator 10 is performed here with the expiry of the prescribed time period $\Delta t_{max}$ when it is simultaneously established that, contrary to the original prediction or the original expectations, the prescribed vehicle body level $d_{i,soll}$ has not yet been achieved solely by actuating the valve device 13. Whether the latter applies is detected by the evaluation unit 24 on the basis of a comparison of the instantaneously present vehicle body level $d_{i,ist}$ with the prescribed vehicle body level $d_{i,soll}$.

If the vehicle body level $d_{i,erw}$ to be expected minus the safety reserve $\Delta d_{safe}$ is smaller than the prescribed vehicle body level $d_{i,soll}$, but is, per se, greater than or equal to the prescribed vehicle body level $d_{i,soll}$, $$d_{i,erw} - \Delta d_{safe} < d_{i,soll} \leq d_{i,erw}, \quad (2.2)$$

it is concluded that a supporting actuation of the pressure generator 10 is required for setting the prescribed vehicle body level $d_{i,soll}$ in addition to carrying out the overflow process, said actuation being performed in the present case in such a way that pressure medium is pumped from the pressure medium reservoir 11 into the actuating devices 12$i$ affected by the setting operation.

If the vehicle body level $d_{i,erw}$ to be expected is smaller than the prescribed vehicle body level $d_{i,soll}$, $$d_{i,erw} < d_{i,soll} \quad (2.3)$$

it is impossible to set the prescribed vehicle body level $d_{i,soll}$ on the basis of carrying out an overflow process.

Correspondingly, opening the bypass valve 21 is omitted and the setting operation is performed solely by actuating the pressure generator 10.

The above considerations are valid for lowering the vehicle body in an analogous way, an actuation of the bypass valve 20 in a way corresponding to the bypass valve 21 being provided for this case.

Setting the instantaneously present vehicle body level $d_{i,ist}$ in accordance with the prescribed vehicle body level $d_{i,soll}$ is performed, for example, in the form of an adjusting operation coordinated by the evaluation unit 24.

It may be remarked at this juncture that it is also alternatively conceivable to calculate the vehicle body level $d_{i,erw}$ to be expected in the case of carrying out the overflow process directly from the internal pressures p, $p_i$ or the internal volumes V, $V_i$. If a pneumatically driven level control system is concerned, the calculation of the vehicle body level $d_{i,erw}$ to be expected can, in particular, also be performed on the basis of a dimensionless variable $\lambda_i$ that represents the ratio between the current air mass m in the pressure medium reservoir 11 and the current air mass $m_i$ in the at least one actuating device 12$i$, $$\lambda_i = \frac{m}{m_i}. \quad (2.4)$$

Assuming that the air inside the level control system behaves like an ideal gas, a ratio of the form $$\frac{p \cdot V}{p_i \cdot V_i} = \frac{m \cdot R \cdot T}{m_i \cdot R \cdot T_i} \quad (2.5)$$

is yielded from equation (2.4) in conjunction with the general gas equation $p \cdot V = m \cdot R \cdot T$ valid in this case, R representing the general gas constant (R=8 314 J/mol$^{-1}$·K$^{-1}$).

Assuming that the temperatures in the pressure medium reservoir 11 and in the at least one actuating device 12$i$ are substantially equal, $T \approx T_i$, it further follows from equation (2.5) that $$\frac{p \cdot V}{p_i \cdot V_i} = \frac{m}{m_i}. \quad (2.6)$$

By contrast with the internal pressures p, $p_i$ or the internal volumes V, $V_i$, the dimensionless variable $\lambda_i$ thus obtained has the advantage that it is largely independent of the temperature. As a result, this enables a particularly simple and reliable calculation of the vehicle body level $d_{i,erw}$ respectively to be expected.

The invention claimed is:

1. A level control system for a vehicle, having a pressure generator (10) for generating a pressure difference between a pressure medium reservoir (11) and at least one pressure-controlled actuating device (12i) by means of which it is possible to set a prescribed vehicle body level ($d_{i,soll}$), and having a valve device (13) for carrying out an overflow process between the pressure medium reservoir (11) and the at least one pressure-controlled actuating device (12i), wherein an evaluation unit (24) decides on the basis of an initial vehicle body level ($d_{i,erw}$) to be expected for the case of carrying out the overflow process whether and to what extent it is possible to set the prescribed vehicle body level ($d_{i,soll}$) solely by actuating the valve device (13), wherein the evaluation unit generates the prescribed vehicle body level based on vehicle speed and the initial and prescribed vehicle body levels represent respective displacements of the at least one pressure-controlled actuating device (21i) and wherein the evaluation unit estimates a gas quantity necessary to effect a height change from the initial vehicle body level to the prescribed vehicle body level and operates the pressure generator based on the gas quantity.

2. The device as claimed in claim 1, wherein the decision as to whether and to what extent it is possible to set the prescribed vehicle body level ($d_{i,soll}$) solely by actuating the valve device (13) is made as a function of a comparison between the prescribed vehicle body level ($di_{i,soll}$) and the initial vehicle body level ($d_{i,erw}$).

3. The device as claimed in claim 2, wherein the pressure generator (10) is actuated in a supporting fashion if it is established that it is not possible to set the prescribed vehicle body level ($d_{i,soll}$) solely by actuating the valve device (13) within a prescribed time period ($\Delta t_{max}$).

4. The device as claimed in claim 3, wherein the pressure generator (10) is actuated in a supporting fashion with the expiry of the prescribed time period ($\Delta t_{max}$).

5. The device as claimed in claim 1, wherein the evaluation unit (24) calculates the initial vehicle body level ($d_{i,erw}$) on the basis of a pressure difference ($\Delta \bar{p}_{i,i=a\ldots d}$) determined between the pressure medium reservoir (11) and the at least one pressure-controlled actuating device (12i).

6. The device as claimed in claim 1, wherein the evaluation unit (24) calculates the initial vehicle body level ($d_{i,erw}$) on the basis of a dimensionless variable ($\lambda_i$) that represents the ratio between the current air mass (m) in the pressure medium reservoir (11) and the current air mass ($m_i$) in the at least one actuating device (12i).

7. The device as claimed in claim 1, wherein the at least one pressure-controlled actuating device (12i) is a pneumatic or hydraulic spring leg.

8. The device as claimed in claim 1, wherein the at least one pressure-controlled actuating device (12i) is a component of an active running gear of the vehicle.

9. The device as claimed in claim 1, wherein it is a level control system having a closed pressure medium circuit.

10. The device of claim 1, wherein there is pressure equalization between the pressure medium reservoir and the at least one setting device after the prescribed vehicle body level ($d_{i,soll}$) is reached.

11. The device of claim 1, wherein to what extent it is possible to set the prescribed vehicle body level ($d_{i,soll}$) solely by actuating the valve device (13), includes increasing and decreasing the vehicle body level to reach the prescribed vehicle body level ($d_{i,soll}$).

12. A method for operating a level control system having a pressure generator (10) for generating a pressure difference between a pressure medium reservoir (11) and at least one pressure-controlled actuating device (12i) by means of which it is possible to set a prescribed vehicle body level ($d_{i,soll}$), and having a valve device (13) for carrying out an overflow process between the pressure medium reservoir (11) and the at least one pressure-controlled actuating device (12i), the method comprising the steps of
determining an initial vehicle body level ($d_{i,erw}$) for the case of carrying out the overflow process,
deciding with an evaluation unit (24) on the basis of the determined initial vehicle body level ($d_{i,erw}$) whether and to what extent it is possible to set the prescribed vehicle body level ($d_{i,soll}$) solely by actuating the valve device (13),
setting the body level according to the decision,
generating the prescribed vehicle body level based on vehicle speed wherein the initial and prescribed vehicle body levels represent respective displacements of the at least one pressure controlled actuating device (21i),
estimating a gas quantity necessary to effect the setting, and
operating a pressure generator based on the gas quantity.

13. The method as claimed in claim 12, wherein deciding on the basis of the determined initial vehicle body level ($d_{i,erw}$) whether and to what extent it is possible to set the prescribed vehicle body level ($d_{i,soll}$) solely by actuating the valve device (13) includes increasing and decreasing the vehicle body level to reach the prescribed vehicle body level ($d_{i,soll}$).

14. The method as claimed in claim 12, wherein the at least one pressure-controlled actuating device (12i) is a component of an active running gear of the vehicle.

15. The method as claimed in claim 12, further including producing a pressure equalization between the pressure medium reservoir and the at least one setting device.

16. The method as claimed in claim 12, further including actuating the pressure generator (10) in a supporting fashion when the prescribed vehicle body level is not reached within a prescribed time period ($\Delta t_{max}$).

* * * * *